June 21, 1955  E. A. SLUSSER  2,711,532

SIMPLIFIED RADAR RANGE UNIT

Filed Oct. 16, 1945

INVENTOR
EUGENE A. SLUSSER

BY
Ralph L. Chappell

ATTORNEY

United States Patent Office 2,711,532
Patented June 21, 1955

2,711,532
SIMPLIFIED RADAR RANGE UNIT

Eugene A. Slusser, Arlington Heights, Mass., assignor, by mesne assignments, to the United States of America as represented by the Secretary of the Navy Application October 16, 1945, Serial No. 622,609

6 Claims. (Cl. 343—7.3)

This invention relates to circuits used in conjunction with radar transmitter-receiver systems which will choose a particular target within the range of the radar and supply a voltage dependent on the range of the target as well as other useful information.

Range units are known in the art which perform the target tracking function by comparing the amount of target signal lying in each of two closely spaced narrow gates. Such range units must, therefore, involve complex circuitry for generating the tracking gates, determining coincidence of gates and video signal, and integrating the signal levels in the two gates, as well as for performing multitudinous related functions.

It is an object of this invention to provide a circuit which will track in range a particular target signal of those being detected by the radar, said circuit performing target range tracking with considerably fewer tubes and other components than are required in conventional double-gate tracking circuits.

It is another object of this invention to provide a circuit which will supply a gate which will be initiated at a time coincident, or for all practical purposes coincident, with the pulsing of the radar transmitter and which is terminated at the time of reception of a particular target signal.

It is another object of this invention to provide a circuit which will supply pulses coincident with a particular target signal.

It is another object of this invention to provide a circuit which will supply a voltage dependent on the range of a particular target, such as to be a measure of the range of the target.

It is another object of this invention to provide a circuit which will supply gated video of a particular target signal, which may be of use in the representation of the target on a suitable indicator or in developing voltages of use in automatic volume control or as error voltages.

Other objects and features of this invention will become apparent upon a careful consideration of the following detailed description when taken together with the accompanying drawings in which.

In subsequent explanations reference will be made to a "primary trigger," by which is meant a voltage pulse of short duration occurring coincident, or for all practical purposes coincident, with the time during which the radar transmitter is pulsed. These triggers occur periodically with a definite frequency, known as the pulse repetition frequency.

Figure 1:
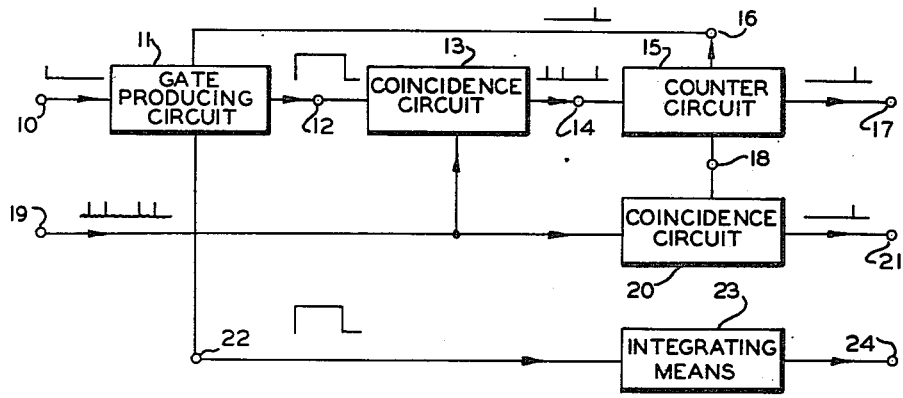
Fig. 1 is a block diagram of an embodiment of the invention.

In the embodiment of Fig. 1 primary triggers are applied to terminal 10 and cause a gate producing circuit 11, which may be a delay multivibrator, to operate, initiating a gate observable on terminal 12, which is applied to a coincidence circuit 13. From terminal 19 radar video from a conventional radar receiver, preferably with saturated target signals, is also applied to coincidence circuit 13. In the absence of a gate from gate producing circuit 11, coincidence circuit 13 has no output to terminal 14. However for each target signal reaching coincidence circuit 13 during the gate a signal, preferably the amplified target signal, is supplied through terminal 14 to counter circuit 15.

By means of a variable circuit element in counter circuit 15, the counter may be adjusted to operate on reception from the coincidence circuit 13 of the first, second, or any other particular signal after the primary trigger. Operation of the counter circuit produces signals, preferably pulses, on terminals 16, 17 and 18.

The output signal on terminal 16 is applied to the gate producing circuit 11 causing the gate to coincidence circuit 13 to be abruptly terminated, so that subsequent target signals are stopped at coincidence circuit 13 and do not have any effect on counter circuit 15 until another primary trigger has occurred, with the initiation of another gate.

The output signal on terminal 17 may be of the form of a pulse initiated by the reception of the particular target signal selected by counter circuit 15, and therefore essentially coincident with it.

It will be seen by those skilled in the art that the circuits represented by the blocks described above may have a multitude of forms and variations. For example, the blocks indicated on the embodiment as gate producing circuit 11, may be one of the multitudinous forms of multivibrator circuits, preferably one giving a rectangular gate output, or it may be another type of gate producing means, such as an Eccles-Jordan trigger circuit, or a flip-flop circuit.

For the block indicated on the embodiment as coincident circuit 13 a pentode may be used with screen grid connected to terminal 12 and control grid connected to terminal 19, and biased to or somewhat below the cut-off voltage. It can be operated as a conventional amplifier or as a cathode follower depending on which polarity of output is desired. Other possible circuits will occur to those skilled in the art.

Figure 2:
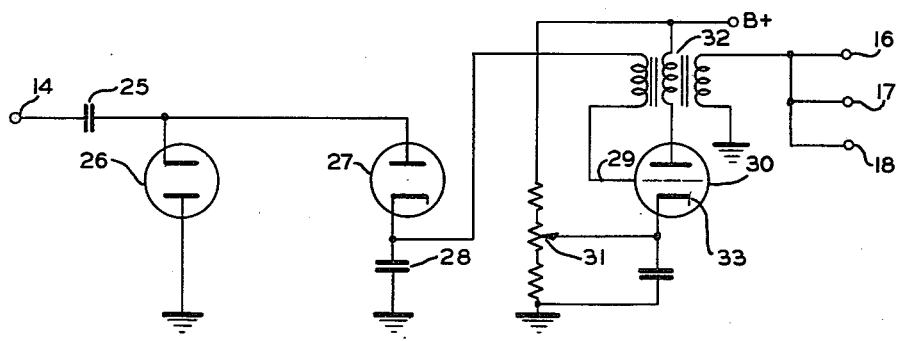
Fig. 2 is a schematic diagram of one of the blocks of Fig. 1.

For the block indicated on the embodiment as counter circuit 15, a schematic diagram is shown in Fig. 2 of a suitable circuit disclosed in Patent Application Serial No. 616,401, filed September 14, 1945 of Richard H. Woodward now Patent No. 2,700,102 dated Jan. 18, 1955. Here the diodes 26 and 27 and condenser 28 constitute an integrating unit for positive pulses, or target signals. The grid 29 of a blocking oscillator tube 30 is connected through the secondary winding of transformer 32 to storage condenser 28, while the cathode is connected to the movable arm of the potentiometer 31, the resistance of which is connected between B+ and ground. By use of potentiometer 31 sufficient bias voltage may be maintained on the cathode 33 of the blocking oscillator tube to thereby render it impossible for the blocking oscillator to operate except under control of the integrating circuit.

The initial charge on storage condenser 28 is zero. Successive positive signals on terminal 14 build up the charge in steps on the storage condenser 28, since positive charges have no path to ground either through diode 26 or through grid 29 which is negative with respect to the cathode 33. At the reception of some particular positive signal the grid 29 becomes sufficiently positive to cause the blocking oscillator to fire. By adjustment of potentiometer 31 the bias of the blocking oscillator may be adjusted to fire on the first, second, or any particular signal received by the counter circuit 15. By the action of the blocking oscillator during firing the positive charge is removed from and a negative charge is built up on storage condenser 28 due to flow of grid current in tube 30. This negative charge is immediately bled to ground through diodes 27 and 26 leaving condenser 28 again at zero charge.

For proper operation of the circuits of this embodiment it is essential that counter circuit 15 always begin its integrating action at the time of the primary trigger. An example of how erroneous results might be obtained is the case in which only three targets are being detected and the counter circuit is adjusted to operate on the fourth target signal received. In this case, if the integration begins at a primary trigger, three signals would have been received by the time of the next primary trigger, and the counter circuit 15 would operate on reception of a target signal corresponding to the closest target and begin counting again, being operated the next time by the signal corresponding to the target of intermediate range, and so on.

To the embodiment may therefore be added means for positively initiating the counter action at the time of the primary trigger. One way to do this is to connect the plate of a triode to the ungrounded side of storage condenser 28. The cathode of this triode should be grounded, and the grid bias resistor return to ground. Through a suitable coupling condenser a negative gate from gate producing circuit 11 should be applied to the grid of the triode. This guarantees that at the termination of the gate the triode becomes conducting and any positive charge on the storage condenser 28 is bled to ground and also provides that during the gate the triode will be cut off and constitute an open circuit. In this connection gate producing circuit 11 should be so constructed as to terminate the gate automatically, if not previously terminated by a signal from counter circuit 15, at some time corresponding to the maximum range of the radar and prior to a succeeding primary trigger.

The circuit combination comprising gate producing circuit 11, coincidence circuit 13, and counter circuit 15 is in itself a useful circuit which supplies on terminals 12 and 22 gates initiated at the primary pulse and terminated at the reception of the particular target signal, and which supplies on terminals 17 and 18 pulses or other signals coincident with the particular target.

Figure 3:
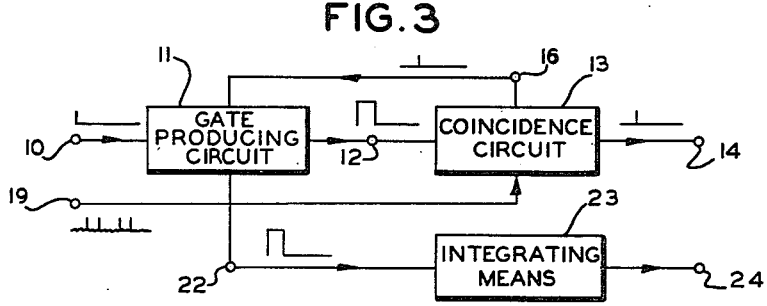
Fig. 3 is a block diagram of a second embodiment of the invention.

It will be obvious to those skilled in the art that if it is desired to construct a circuit combination which will track only the target nearest in range of those being detected, counter circuit 15 is unnecessary and may be eliminated from the block diagram. The combination of gate producing circuit 11 and coincidence circuit 13 may be used to supply the outputs named in the preceding paragraph. Such an embodiment is shown in Fig. 3.

Referring again to Fig. 1 the output signal on terminal 18, which is preferably a pulse, is applied to coincidence circuit 20 permitting video applied from terminal 19 to be transmitted to terminal 21, possibly with some amplification. In the absence of an output signal of the proper polarity from counter 15 the coincidence circuit 20 will have no output to terminal 21. It can be seen that the signal on terminal 21 is the gated video of the particular target signal which operates counter 15. In this connection it will be useful to incorporate a small delay in coincidence circuit 20 so that the target signal as observed on terminal 21 will be centrally positioned in the gate.

Coincidence circuit 20 may be a pentode as described above, with its screen grid connected to terminal 18 and control grid connected to terminal 19 and biased to or somewhat below the cut-off voltage.

An output of the gate producing circuit 11, observable on terminal 22, is a preferably rectangular gate of the same duration and time of occurrence as the gate on terminal 12 though not necessarily of the same magnitude or polarity. It can be seen that the duration of this gate represents the time interval between the primary pulse and the reception of a particular target signal, and hence is proportional to the range of the particular target.

If, therefore, this gate as it repeatedly occurs with the pulse repetition frequency is integrated in a suitable integrating means 23, which may be a suitable detector, an output voltage will be obtained dependent on, and with proper design proportional to, the range. This voltage is observable on terminal 24.

A multitude of variations for the block designated as integrating means 23 will occur to those skilled in the art. For example, a suitable coupling circuit and a filter to remove the alternating component of the voltage on terminal 22 would yield a direct voltage output on terminal 24 corresponding to the integral of the gate wave form.

The invention is to be limited only by the appended claims.

What is claimed is:

1. In an automatic target tracking radio pulse-echo detecting system, a range circuit comprising a source of voltage pulses coincident in time with the transmitted pulses of said system, a rectangular voltage wave generator, means applying said voltage pulses to said generator to initiate a rectangular voltage wave, means responsive to target echo signals from all targets and to said rectangular voltage wave to produce an output signal pulse for each target echo signal occurring in time coincidence with said voltage wave, a counter responsive to said output signal pulses and adjustable to produce an output pulse when a predetermined number of pulse signals are impressed thereon, and means to impress said counter output pulse to said generator to terminate said rectangular voltage wave.

2. With the combination of claim 1, a circuit responsive to said counter output pulse and to target echo signals from all targets to produce a signal output corresponding to the selected predetermined target echo pulse.

3. With the combination of claim 1, an integrating means the input to which is the rectangular voltage wave from said generator to produce a voltage wave proportional to the time duration of said voltage wave to represent the range of the selected predetermined target.

4. In an automatic tracking radio pulse echo detecting system, a range circuit comprising a source of voltage pulses coincident in time with the transmitted pulses of said system, a rectangular voltage wave generator, means applying said voltage pulses to said generator to initiate a rectangular voltage wave, a normally non-conducting coincidence circuit responsive to target echo signals from all targets and biased by said rectangular voltage wave to reproduce in its output circuit a signal pulse for each target echo signal occurring in time coincident with said voltage wave, a counter circuit connected to the output of said coincident circuit and adjustable to generate a single output control pulse in response to a predetermined number of said signal pulses and corresponding to a particular target echo pulse, and means to apply said control pulse to said generator to terminate said rectangular voltage wave.

5. With the combination of claim 4, a second coincidence circuit response to said counter output control pulse and to target echo signals from all targets to reproduce in its output circuit a signal pulse coincident in time with said predetermined particular target echo pulse.

6. With the combination of claim 4, an integrator responsive to said rectangular voltage wave to produce in its output circuit a voltage wave having an amplitude proportional to the time duration of said rectangular voltage wave to represent the range of a said particular target.

References Cited in the file of this patent

UNITED STATES PATENTS

| | | |
|---|---|---|
| 2,400,641 | Hardy | May 21, 1946 |
| 2,403,527 | Hershberger | July 9, 1946 |
| 2,404,527 | Potapenko | July 23, 1946 |
| 2,407,198 | Wolff | Sept. 3, 1946 |
| 2,412,111 | Wilson | Dec. 3, 1946 |
| 2,421,018 | De Rosa | May 27, 1947 |
| 2,428,058 | Wise | Sept. 30, 1947 |
| 2,433,667 | Hollingsworth | Dec. 30, 1947 |
| 2,445,584 | Ramo | July 20, 1948 |
| 2,485,584 | Gintzon | Oct. 25, 1949 |